US008660585B2

(12) United States Patent
Zhao et al.

(10) Patent No.: US 8,660,585 B2
(45) Date of Patent: Feb. 25, 2014

(54) METHOD AND DEVICE FOR CONTROLLING WIRELESS COMMUNICATION TERMINAL SERVICE BASED ON POSITIONAL AREA

(75) Inventors: Qian Zhao, Shenzhen (CN); Zhenzhuo Zeng, Shenzhen (CN); Chenxi Li, Shenzhen (CN)

(73) Assignee: ZTE Corporation, Hi-Tech Industrial Park, Nanshan District, Shenzhen, Guangdong Province (CN)

( * ) Notice: Subject to any disclaimer, the term of this patent is extended or adjusted under 35 U.S.C. 154(b) by 0 days.

(21) Appl. No.: 13/581,324

(22) PCT Filed: Sep. 21, 2010

(86) PCT No.: PCT/CN2010/077209
§ 371 (c)(1),
(2), (4) Date: Aug. 27, 2012

(87) PCT Pub. No.: WO2011/143884
PCT Pub. Date: Nov. 24, 2011

(65) Prior Publication Data
US 2013/0053073 A1    Feb. 28, 2013

(30) Foreign Application Priority Data

May 17, 2010    (CN) .......................... 2010 1 0175503

(51) Int. Cl.
*H04W 24/00* (2009.01)
(52) U.S. Cl.
USPC ............... 455/456.6; 455/456.1; 455/418; 455/456.5
(58) Field of Classification Search
USPC .................... 455/456.6, 456.1, 418
See application file for complete search history.

(56) References Cited

U.S. PATENT DOCUMENTS

| | | | |
|---|---|---|---|
| 2008/0214186 A1* | 9/2008 | Bizzarri et al. | 455/425 |
| 2010/0311402 A1* | 12/2010 | Srinivasan et al. | 455/418 |
| 2010/0311404 A1* | 12/2010 | Shi et al. | 455/419 |
| 2010/0311418 A1* | 12/2010 | Shi et al. | 455/432.1 |
| 2011/0007901 A1* | 1/2011 | Ikeda et al. | 380/270 |

FOREIGN PATENT DOCUMENTS

| | | |
|---|---|---|
| CN | 1777330 A | 5/2006 |
| CN | 101237705 A | 8/2008 |
| CN | 101815339 A | 8/2010 |

OTHER PUBLICATIONS

International Search Report for PCT/CN2010/077209 dated Feb. 24, 2011.

* cited by examiner

*Primary Examiner* — Danh Le
(74) *Attorney, Agent, or Firm* — Husch Blackwell LLP

(57) ABSTRACT

A method for controlling wireless communication terminals based on location areas is disclosed, including: a wireless communication terminal obtaining its own current location information (101); using a service and function control table to deactivate services and functions that need to be restricted according to the obtained location information, and storing the location information and the deactivated services and functions (102); the wireless communication terminal re-obtaining the location information, activating restriction-cancelled services and functions or deactivating restricted services and functions according to the re-obtained location information, the stored location information and/or the deactivated services and functions; a device for controlling wireless communication terminals based on location areas is also disclosed, and the method and device can be used to control all the services and functions of the wireless communication terminal at the terminal side, so that controlling the wireless communication terminal is more flexibly and more targeted.

14 Claims, 1 Drawing Sheet

US 8,660,585 B2

METHOD AND DEVICE FOR CONTROLLING WIRELESS COMMUNICATION TERMINAL SERVICE BASED ON POSITIONAL AREA

TECHNICAL FIELD

The present invention relates to the field of service control of the wireless communication terminal, and more especially, to a method and device for controlling the services of the wireless communication terminal based on location area.

BACKGROUND OF THE RELATED ART

With the development of wireless communication technology, the services supported by the wireless communication terminal have become increasingly diverse, and they comprise ordinary services such as voice service, packet data service, short message service, positioning services and so on, moreover, most of the wireless communication terminals also support the Internet, video call, photograph, radio, music playing and other functions.

In some special circumstances, such as: confidential units, important meeting areas, prisons, detention centers and so on, in order to prevent information leakage and other special purposes, sometimes it needs to control the wireless communication terminal's services and functions, that is: when entering a certain area, certain users are not allowed to use some special services and functions in the wireless communication terminal, and these services and functions comprise not only network-related services such as short message service and data service and so on, but also some of the wireless communication terminal's own functions that are unrelated with the network, such as camera, radio and so on.

Under normal circumstances, the network-related services can be achieved by activating or deactivating the specific services via the system side of the wireless communication network, but it can only perform the same restrictions on all wireless communication terminals within the area controlled by the system side, but in the actual situations, it might only need to restrict those wireless communication terminals used by some specific user groups. Moreover, the current network-unrelated functions in the wireless communication terminal cannot be controlled from the system side.

SUMMARY OF THE INVENTION

In view of this, the main purpose of the present invention is to provide a method and device for controlling services of a wireless communication terminal based on location areas to differently set services and functions, which need to be restricted, for different users' wireless communication terminals at the terminal side and to control all the services and functions in the wireless communication terminal, so that the service control of the wireless communication terminal becomes more flexible and more targeted.

To achieve the aforementioned purpose, the technical solution of the present invention is accomplished as follows:

the present invention provides a method for controlling services of a wireless communication terminal based on location areas, said method comprising:

a wireless communication terminal obtaining own current location information;

using a service and function control table to deactivate services and functions that need to be restricted according to the obtained location information, and storing the location information and the deactivated services and functions;

the wireless communication terminal re-obtaining location information, and according to the re-obtained location information, the stored location information, and/or the deactivated services and functions, activating restriction-cancelled services and functions or deactivating restricted services and functions.

After activating the restriction-cancelled services and functions or deactivating the restricted services and functions, the method also comprises: returning to wait for location information which is obtained next time.

Activating the restriction-cancelled services and functions or deactivating the restricted services and functions according to the re-obtained location information, the stored location information, and/or the deactivated services and functions specifically comprises:

judging whether the re-obtained location information is the same as own stored location information or not, if same, not performing processing, otherwise, activating the deactivated services and functions, and then according to the re-obtained location information, using the service and function control table to determine the services and functions that need to be deactivated; or using the service and function control table to determine the restricted services that need to be deactivated according to the re-obtained location information, and then comparing the determined and restricted services that need to be deactivated with the stored and deactivated services and functions, if the deactivated services and functions are still restricted services, maintaining a deactivation state; if the deactivated services and functions no longer need to be restricted, activating the services and functions; if there are new services and functions that need to be deactivated, deactivating the new services and functions that need to be deactivated.

Before the wireless communication terminal obtains the own current location information, the method also comprises: storing the service and function control table including the location information and the services and functions that need to be restricted corresponding to the location information into the wireless communication terminal;

the service and function control table is updated through a system side or other wireless communication terminal sending messages.

Said obtaining the location information is: actively obtaining the location information, and/or passively obtaining the location information.

The storing is: marking in the service and function control table, or individually setting variables in a terminal's memory to store a restriction state.

The present invention also provides a device for controlling services of a wireless communication terminal based on location areas, and the device is in the wireless communication terminal, and the device comprises: a location acquisition module, a restriction judgment module and a restriction processing module, wherein, the location acquisition module is configured to obtain current location information of the wireless communication terminal, and send the obtained location information to the restriction judgment module;

the restriction judgment module is configured to use a service and function control table to determine services and functions that need to be deactivated according to the received location information, send a deactivation message to the restriction processing module, and store the location information and deactivated services and functions; according to re-obtained location information, combined with the stored location information, and/or the deactivated services and functions, activate restriction-cancelled services and functions or deactivate restricted services and functions, and send the deactivation message or an activation message to the restriction processing module;

the restriction processing module is configured to perform an activation or deactivation operation on the services and functions that need to be activated or deactivated after receiving the activation or deactivation message.

The device also comprises: a state storage module, which is configured to store the deactivated services and functions and corresponding location information, and provide the restriction judgment module with the location information;

the restriction judgment module is also configured to store the deactivated services and functions and the corresponding location information in the state storage module.

The method and device for controlling the wireless communication terminal based on the location area provided in the present invention use the service and function control table containing the location information and the restricted services corresponding to the location information preset in the wireless communication terminal to control the services of the wireless communication terminal, so that the wireless communication terminal do not need to have too much interaction with the system side, not only the network-related services in the wireless communication terminal but also the own services and functions which is unrelated with network in the wireless communication terminal can be controlled, thus the service control of the wireless communication terminal is more flexible and more targeted.

PREFERRED EMBODIMENTS OF THE PRESENT INVENTION

The basic idea of the present invention is: the wireless communication terminal obtains its own location information, and according to the obtained location information, it uses the service and function control table to deactivate the services and functions that need to be restricted, and stores the currently obtained location information and the deactivated services and functions; when the re-obtained location information is different from the previously obtained location information, the deactivated services and functions are activated.

In the following, the technical solution of the present invention is further described in detail in combination with the accompanying drawings and specific embodiments.

Figure 1:
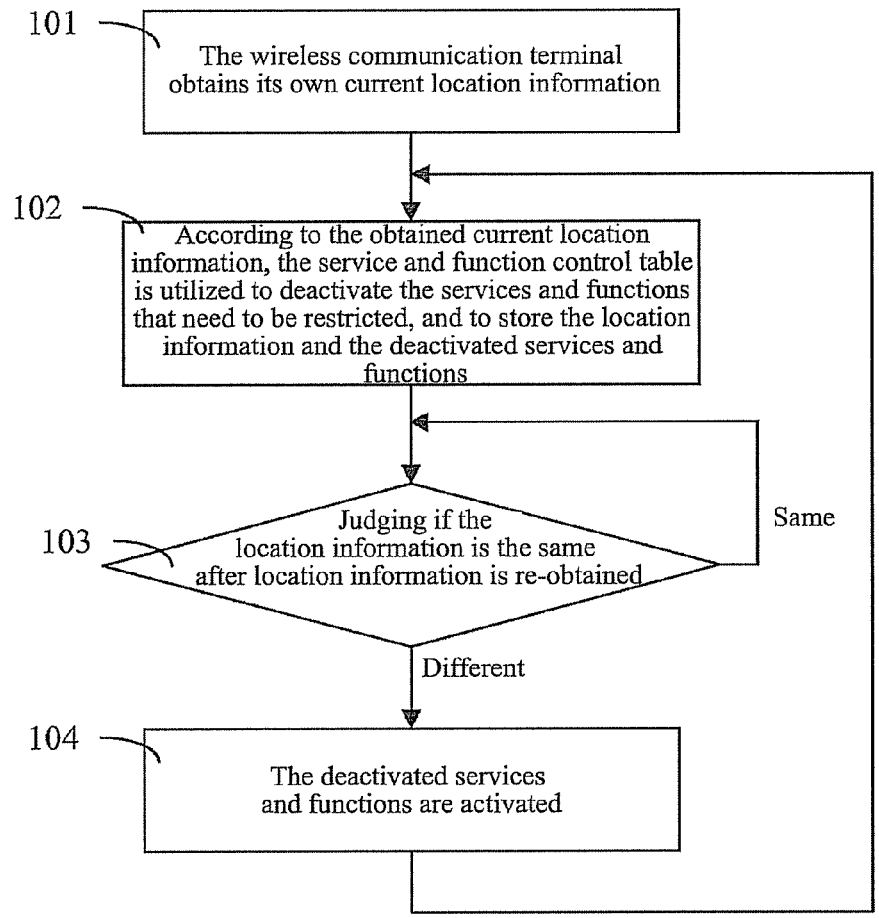
FIG. 1 is a flow chart of a method for controlling services of a wireless communication terminal based on location areas in accordance with the present invention.

FIG. 1 is a flow chart of the method for controlling services of a wireless communication terminal based on location areas in accordance with the present invention, and as shown in FIG. 1, the method for controlling services of a wireless communication terminal based on the location areas comprises the following steps:

in step 101, the wireless communication terminal obtains its own current location information;

specifically, the method for obtaining the location information can be classified as the actively obtaining and/or passively obtaining; wherein, the actively obtaining is to set a timer in the wireless communication terminal, and through the positioning device, such as: the Global Positioning System (GPS), actively update the location information at each time interval;

passively obtaining is that the wireless communication terminal passively receives the location or area information sent by the system side, such as: the field of REG_ZONE, the Location Area Code (LAC), or the dispatch location area (DLA) in the cluster system. Wherein, the field of REG_ZONE is that the wireless communication terminal will receive the system parameter message sent by the system side when the location of the wireless communication terminal changes, and the system parameter message carries the field of REG_ZONE indicating the location area; the LAC is that the entire network is divided into different service areas in accordance with the location areas in the Code Division Multiple Access (CDMA) system, and the mobile switching center (MSC) includes the LAC indicating the location area in the paging request which is sent; the DLA is that the DLA information indicating the current location area is obtained through the response message sent by the system side in the cluster system when the wireless communication terminal performs the location registration, and if the inter-dispatch location area switching happens during the calling state, the wireless communication terminal can obtain the current DLA information through the switching response message sent by the system side, or obtain the current DLA information through the shared forward service channel periodic broadcast message. The wireless communication terminal can passively receive the information sent by the system side to obtain the current location information through the aforementioned three types of messages.

In step 102, according to the obtained current location information, the service and function control table (SFCT) is utilized to deactivate the services and functions that need to be restricted and store the location information and the deactivated services and functions;

specifically, the service and function control table comprises location information and the services and functions that need to be restricted corresponding to the location information. The location information and the deactivated services and functions are stored specifically by marking in the service and function control table or individually setting variables in the wireless communication terminal's memory to store the restriction state. Table 1 is a structure of the service and function control table including the storage function, as shown in Table 1:

TABLE 1

| | Location marker | | | | |
|---|---|---|---|---|---|
| | Location 1 | Location 2 | Location 3 | Location 4 | ... |
| Restricted service items | Service A Service B | Service B Service C | Service A Service C Service D | Service B Service E | ... |
| Deactivation state | Deactivated | | | | ... | wherein, the location marker (location 1, location 2, location 3, location 4 . . . ) respectively corresponds to the location information acquired by the wireless communication terminal at each time; the restricted service items are services restricted on special occasions as needed; the deactivation state refers to the stored service restrictions being executed after the services are deactivated. For example: the wireless communication terminal enters within the range of the location 1, it deactivates the service A and the service B according to the service and function control table and marks the deactivation state as deactivated.

Furthermore, according to the requirements on the service and function control of different areas in the practical applications, the services and functions of the wireless communication terminal in different locations are restricted and they are made into the service and function control table and pre-stored in the required wireless communication terminal. The location marker in the service and function control table corresponds to the location information that can be obtained by the wireless communication terminal, for example: the location 1 can correspond to the GPS coordinate range, and/or REG_ZONE 1, and/or LAC1, and/or DLA1.

For different users, the data content of the service and function control table can be updated through the system side sending messages or flexibly updated by another wireless communication terminal sending short messages and other methods.

In step 103, the wireless communication terminal obtains its own current location information again and judges whether the currently obtained location information is the same as the previously obtained location information or not, if they are the same, no processing is performed and wait to obtain the next location information, return to step 103, otherwise, proceed to step 104;

specifically, the wireless communication terminal waits to obtain the location information again, and the acquisition method is the same as the step 101. After the new location information is acquired, it is compared with the stored location information of the deactivated services and functions to judge whether the location information in the two acquisitions is the same or not, and if same, it indicates that the wireless communication terminal is still in a restricted area, therefore, no processing is processed and wait to acquire the next location information, otherwise, it indicates that the location area where the wireless communication terminal is located has changed.

In step 104, the deactivated services and functions are activated.

Specifically, when the location area of the wireless communication terminal changes, it indicates that the terminal has left the stored location of the deactivated services and functions, therefore, the deactivated and restricted services are activated. After the restricted services and functions are activated, if storing the location information and the deactivated services and functions is implemented by marking in the service and function control table, the marker is cleared; if the storing is implemented by individually setting a variable in the memory of the wireless communication terminal to store the restriction state, the corresponding storage items are cleared. After activating the deactivated services and functions, it also needs to execute step 102 again, whether there are services required to be restricted in the new location area is checked.

Furthermore, in step 103, after the wireless communication terminal obtains its own new current location information, it can also use the service and function control table to determine the restricted services that need to be deactivated, and then the restricted services required to be deactivated that are determined are compared with the stored and deactivated services and functions, and if the deactivated services and functions are still restricted services, the deactivated state is maintained; if there is no need to restrict the deactivated services and functions any more, the services and functions are activated; if there are new services and functions need to be deactivated, the new services and functions that need to be deactivated are deactivated. After completing operations of activating or deactivating the services and functions, the stored and deactivated services and functions are updated and return to wait for the new location information. The method of using the stored and deactivated services and functions to activate or deactivate the services and functions can also cooperate with the method of using the stored and previously obtained location information in the steps 103 and 104 to activate or deactivate the services and functions.

Figure 2:
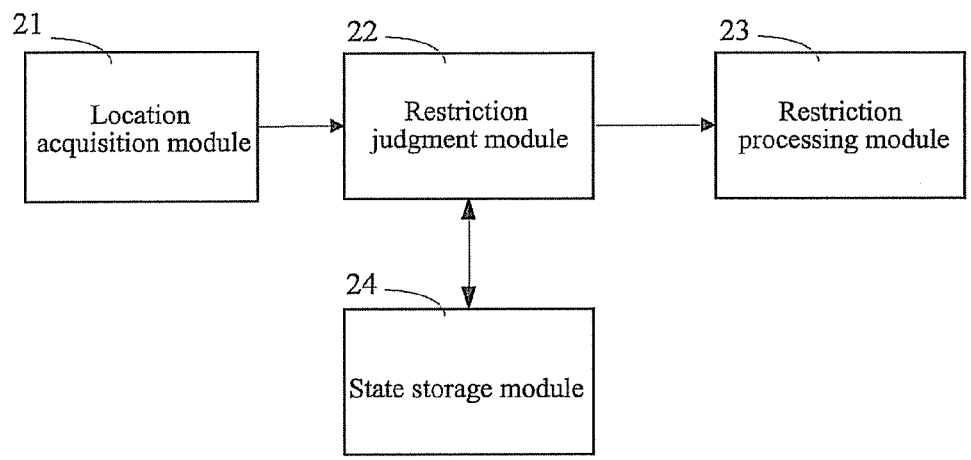
FIG. 2 is a structural schematic diagram of a device for controlling services of a wireless communication terminal based on location areas in accordance with the present invention.

FIG. 2 is a structural schematic diagram of the device for controlling services of a wireless communication terminal based on location areas in accordance with the present invention, and as shown in FIG. 2, the service control device is located in the wireless communication terminal, specifically comprising: the location acquisition module 21, the restriction judgment module 22 and the restriction processing module 23, wherein, the location acquisition module 21 is configured to obtain the own current location information of the wireless communication terminal, and send the obtained location information to the restriction judgment module 22;

specifically, the method for the location acquisition module 21 obtaining the location information can be classified as actively obtaining and/or passively obtaining; wherein, the actively obtaining is to set a timer in the wireless communication terminal, and through the positioning device such as the Global Positioning System (GPS), actively update the location information at each time interval; and the passively obtaining is that the wireless communication terminal passively receives the location or area information sent by the system side, such as: the field of REG_ZONE, the LAC information or the DLA information. Through the aforementioned three kinds of information, the location acquisition module 21 can passively receive the information sent by the system side to obtain the current location information.

The restriction judgment module 22 is configured to use the service and function control table to determine the services and functions that need to be deactivated according to the received location information, send a deactivation message to the restriction processing module 23, and store the location information and the deactivated services and functions; according to the newly obtained location information, combined with the stored location information or the deactivated services and functions, activate the restriction-cancelled services and functions or deactivate the restricted services and functions, and send an activation message to the restriction processing module 23;

specifically, the service and function control table comprises the location information and the services and functions that need to be restricted corresponding to the location information; storing the location information and the deactivated services and functions can be implemented by marking the deactivation state in the service and function control table, and the specific structure is shown in Table 1.

Furthermore, according to the requirements on the service and function control of different areas in the practical applications, the services and functions of the wireless communication terminals in different locations are restricted, and they are made into the service and function control table and pre-stored in the restriction judgment module 22.

The location marker in the service and function control table corresponds to the location information that can be obtained by the wireless communication terminal, for example: the location 1 can correspond to the GPS coordinate range, and/or the REG_ZONE 1, and/or the LAC1, and/or the DLA1. For different users, the data content of the service and function control table can be updated through the system side sending messages or flexibly updated by another wireless communication terminal sending short messages and other methods.

There are specifically two methods for activating the restriction-cancelled services and functions or deactivating the restricted services and functions in combination with the stored location information or the deactivated services and functions:

one is: after the new location information is acquired, it is compared with the stored location information of the deactivated services and functions to judge whether the location information in the two acquisitions is the same or not, and if same, it indicates that the wireless communication terminal is still in a restricted area therefore, no processing is performed and wait to acquire the next location information, otherwise, it indicates that the location area of the wireless communication terminal has changed, the deactivation state in the service and function control table is cleared and an activation message is sent.

The other is: the new own current location information is obtained, and the service and function control table is firstly utilized to determine the restricted services that need to be deactivated, and then the restricted services required to be deactivated that are determined are compared with the stored and deactivated services and functions, and if the deactivated services and functions are still restricted services, the deactivation state is maintained; if there is no need to restrict the deactivated services and functions any more, an activation message is sent to activate the services and functions; if there are new services and functions required to be deactivated, a deactivation message is sent to deactivate the new services and functions that need to be deactivated. After completing operations of activating or deactivating the services and functions, the stored and deactivated services and functions are updated and return to wait for the new location information.

The restriction processing module 23 is configured to perform activation or deactivation operations on the services and functions that need to be activated or deactivated after receiving the activation or deactivation message.

Specifically, after the restriction processing module 23 perform the activation operation, it sends a returning message to notify the restriction judgment module 22 to determine the services and functions that need to be deactivated according to the newly obtained location information.

Furthermore, after the restriction judgment module 22 sends the deactivation message, it is also configured to store the deactivated services and functions and the corresponding location information into the state storage module 24;

the state storage module 24 is configured to store the deactivated services and functions and the corresponding location information, and provide the restriction judgment module 22 with the location information.

Specifically, after the restriction judgment module 22 sends the activation message, the corresponding storage items in the state storage module 24 are cleared.

The above description is only the preferred embodiments of the present invention and is not intended to limit the protection scope of the present invention, any changes, equivalent replacements and improvements and so on made within the spirits and principles of the present invention should be included within the protection scope of the present invention.

What is claimed is:

1. A method for controlling services of a wireless communication terminal based on location areas, said method comprising:

the wireless communication terminal obtaining own current location information;

using a service and function control table to deactivate services and functions that need to be restricted according to the obtained location information, and storing the location information and the deactivated services and functions;

the wireless communication terminal re-obtaining location information, and according to the re-obtained location information, the stored location information and/or the deactivated services and functions, activating restriction-cancelled services and functions or deactivating restricted services and functions;

wherein the step of according to the re-obtained location information, the stored location information and/or the deactivated services and functions, activating the restriction-cancelled services and functions or deactivating the restricted services and functions comprises:

judging whether the re-obtained location information is the same as own stored location information or not, if same, not performing processing, otherwise, activating the deactivated services and functions, and then according to the re-obtained location information, using the service and function control table to determine services and functions that need to be deactivated; or using the service and function control table to determine the restricted services that need to be deactivated according to the re-obtained location information, and then comparing the determined and restricted services that need to be deactivated with the deactivated services and functions that is stored, if the deactivated services and functions are still the restricted services, maintaining a deactivation state; if the deactivated services and functions no longer need to be restricted, activating the services and functions; if there are new services and functions that need to be deactivated, deactivating the new services and functions that need to be deactivated.

2. The method of claim 1, wherein after the step of activating the restriction-cancelled services and functions or deactivating the restricted services and functions, the method further comprises: returning to wait for location information which is obtained next time.

3. The method of claim 1, wherein, before the wireless communication terminal obtains the own current location information, the method further comprises: storing the service and function control table including the location information and the services and functions that need to be restricted corresponding to the location information into the wireless communication terminal;

the service and function control table is updated through a system side or other wireless communication terminal sending messages.

4. The method of claim 1, wherein, said obtaining the location information is: actively obtaining the location information, and/or passively obtaining the location information.

5. The method of claim 1, wherein, the storing is: marking in the service and function control table, or individually setting variables in a terminal's memory to store a restriction state.

6. The method of claim 2, wherein, before the wireless communication terminal obtains the own current location information, the method further comprises: storing the service and function control table including the location information and the services and functions that need to be restricted corresponding to the location information into the wireless communication terminal;

the service and function control table is updated through a system side or other wireless communication terminal sending messages.

7. The method of claim 2, wherein, said obtaining the location information is: actively obtaining the location information, and/or passively obtaining the location information.

8. The method of claim 2, wherein, the storing is: marking in the service and function control table, or individually setting variables in a terminal's memory to store a restriction state.

9. A device for controlling services of a wireless communication terminal based on location areas, located in the wireless communication terminal, the device comprising: a location acquisition module, a restriction judgment module and a restriction processing module, wherein, the location acquisition module is configured to obtain current location information of the wireless communication terminal, and send the obtained location information to the restriction judgment module;

the restriction judgment module is configured to use a service and function control table to determine services and functions that need to be deactivated according to the received location information, send a deactivation message to the restriction processing module, and store the location information and deactivated services and functions; according to re-obtained location information, combined with the stored location information and/or the deactivated services and functions, activate restriction-cancelled services and functions or deactivate restricted services and functions, and send the deactivation message or an activation message to the restriction processing module;

the restriction processing module is configured to perform an activation or deactivation operation on the services and functions that need to be activated or deactivated after receiving the activation or deactivation message;

wherein according to newly obtained location information, combined with the stored location information and/or the deactivated services and functions, the restriction judgment module activating the restriction-cancelled services and functions or deactivating the restricted services and functions comprises:

judging whether the re-obtained location information is the same as own stored location information or not, if same, not performing processing, otherwise, activating the deactivated services and functions, and then according to the re-obtained location information, using the service and function control table to determine the services and functions that need to be deactivated; or using the service and function control table to determine the restricted services that need to be deactivated according to the re-obtained location information, and then comparing the determined and restricted services that need to be deactivated with the deactivated services and functions that is stored, if the deactivated services and functions are still the restricted services, maintaining a deactivation state; if the deactivated services and functions no longer need to be restricted, activating the services and functions; if there are new services and functions that need to be deactivated, deactivating the new services and functions that need to be deactivated.

10. The device of claim 9, wherein the restriction processing module is further configured to send a returning message to notify the restriction judgment module to wait for next obtained location information after performing the activation or deactivation operation.

11. The device of claim 9, wherein the restriction judgment module is further configured to pre-store the service and function control table;

the service and function control table comprises: the location information and services and functions that need to be restricted corresponding to the location information;

the service and function control table is updated through a system side or other wireless communication terminal sending messages.

12. The device of claim 9, wherein the device further comprises: a state storage module, which is configured to store the deactivated services and functions and corresponding location information, and provide the restriction judgment module with the location information;

the restriction judgment module is further configured to store the deactivated services and functions and the corresponding location information in the state storage module.

13. The device of claim 10, wherein the restriction judgment module is further configured to pre-store the service and function control table;

the service and function control table comprises: the location information and services and functions that need to be restricted corresponding to the location information;

the service and function control table is updated through a system side or other wireless communication terminal sending messages.

14. The device of claim 10, wherein the device further comprises: a state storage module, which is configured to store the deactivated services and functions and corresponding location information, and provide the restriction judgment module with the location information;

the restriction judgment module is further configured to store the deactivated services and functions and the corresponding location information in the state storage module.

* * * * *